July 9, 1929.    J. SCHADE    1,720,242
LOOSE LEAF BOOK
Filed June 16, 1928    4 Sheets-Sheet 1
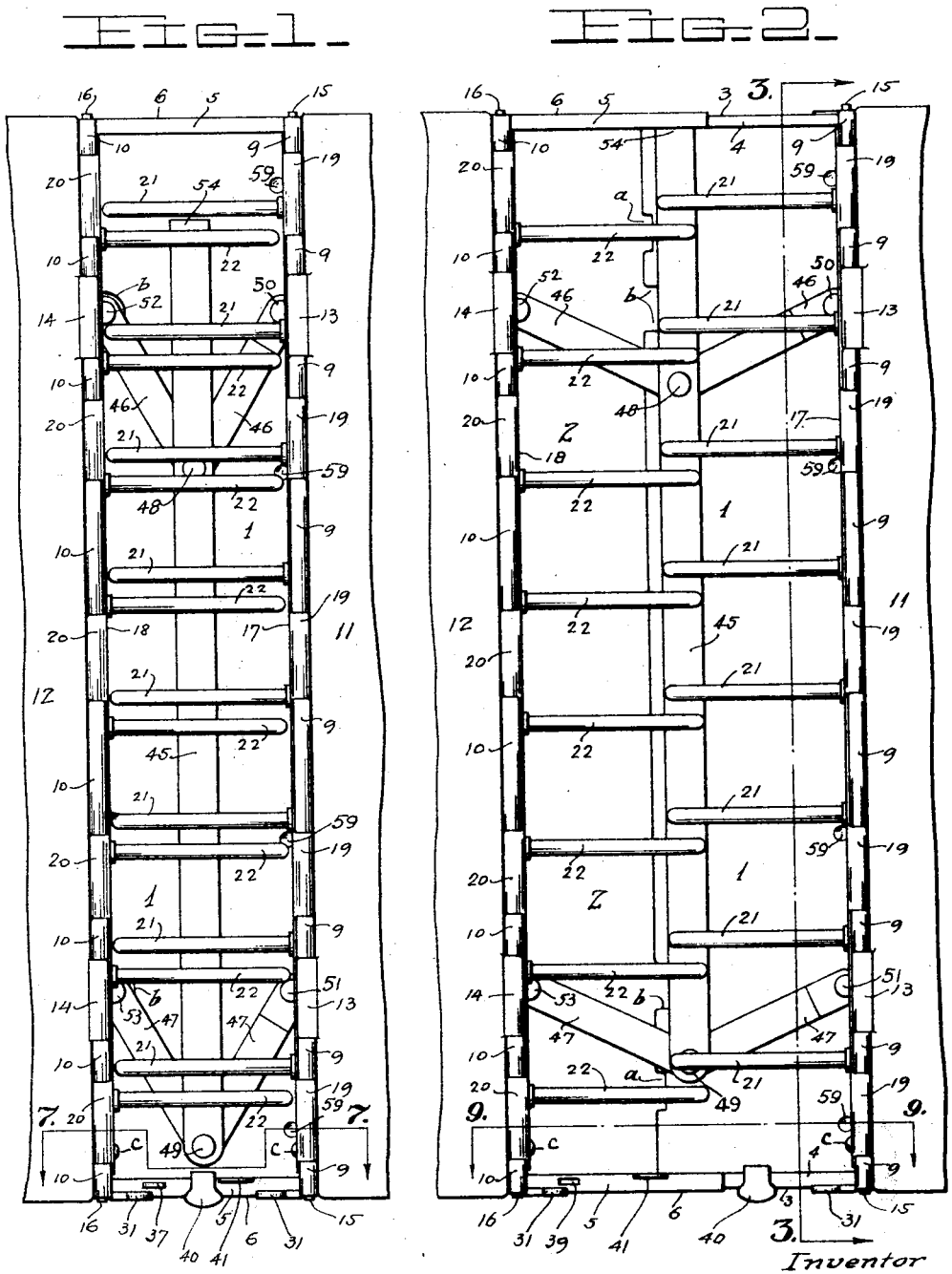
Inventor
John Schade
by
Attorney

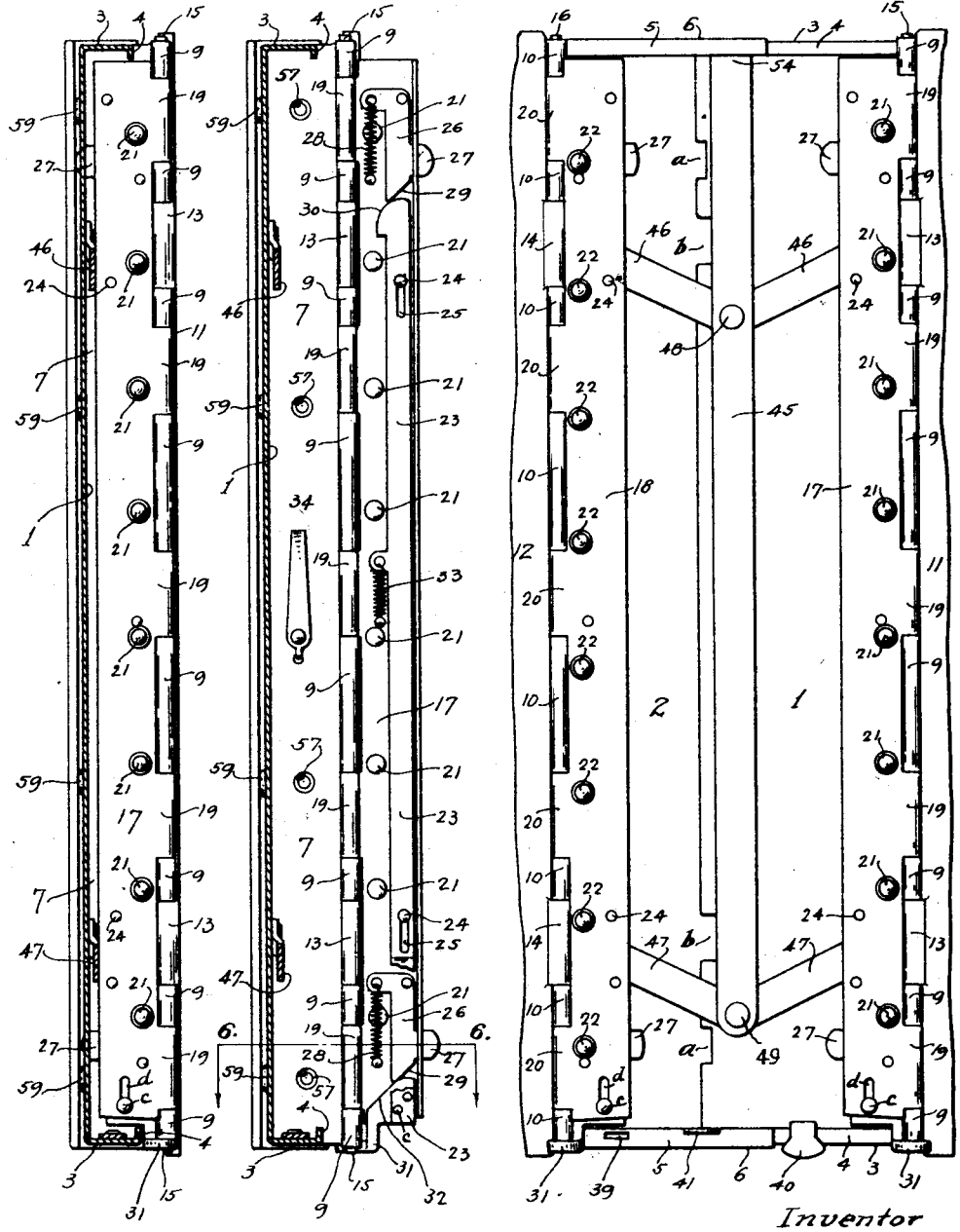

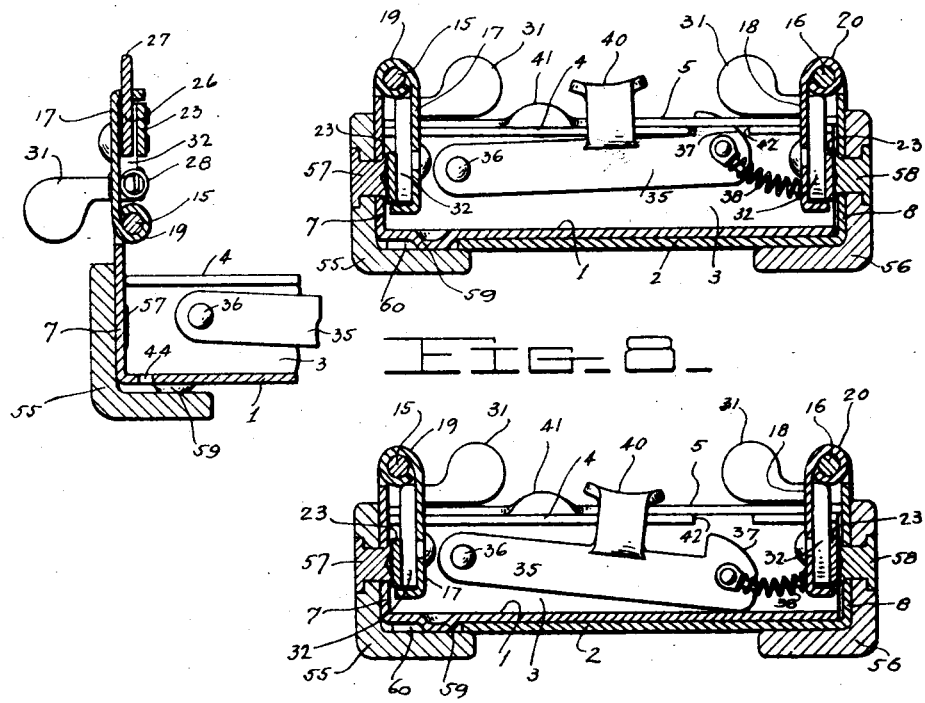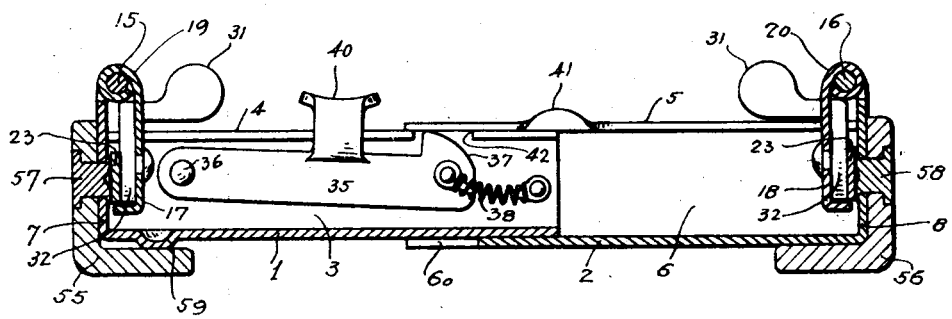

July 9, 1929.  J. SCHADE  1,720,242
LOOSE LEAF BOOK
Filed June 16, 1928  4 Sheets-Sheet 4

Inventor
John Schade
by
Attorney

Patented July 9, 1929.

1,720,242

UNITED STATES PATENT OFFICE.

JOHN SCHADE, OF HOLYOKE, MASSACHUSETTS, ASSIGNOR TO THE NATIONAL BLANK BOOK CO., OF HOLYOKE, MASSACHUSETTS, A CORPORATION OF MASSACHUSETTS.

LOOSE-LEAF BOOK.

Application filed June 16, 1928. Serial No. 285,795.

This invention relates to loose leaf binders, but particularly has reference to binders of the ledger construction and which comprise two telescoping sections each section carrying straight posts for holding the leaves, the latter having along their inner edges perforations so that they may be placed over these posts, and loose leaf books of this description are capable of various uses other than that of a mere ledger, and in the present construction, loose leaves of any description may be placed over the posts, so that they can be swung from one side to the other of the structure, and any of these leaves may be removed and be replaced, or additional leaves may be utilized in any manner common to loose leaf books of this description.

In this improvement the posts are carried by elongated leaves that are pivotally related to the respective sections, and are positively locked to the latter when the leaves are closed, and the posts in their normal condition, are parallel with each other and with the bottoms of the sections and are in staggered relation so that sheets may be readily manipulated from one side of the structure to the other as is usual in devices of this description.

Furthermore, this improvement employs an automatically operating mechanism which equalizes the strains that are applied to open and close the telescoping sections, this mechanism including an elongated float bar one end of which functions as a stop to prevent undue spreading of the sections.

A further characteristic of this improvement is that the outer lower corner portions of the telescoping sections are protected by a non-metallic substance, such as vulcanized fiber, which is riveted to the sides of the sections, and which is spaced from the bottom of the inner section so as to permit of the final closing of the outer section, this fiber protection not only adding to the appearance of the structure, but also preventing the latter from marring a desk or table.

In this improvement the side covers and the elongated leaves are pivoted to the upper edges of the sides of the telescoping sections so that these covers and leaves may have independent pivotal swinging movements.

The accompanying drawings illustrate a preferred embodiment of this invention and in these drawings Figure 1 is an inside view of the loose leaf book as it appears in normal condition with the side covers opened.

Figure 2 is a similar view with the telescoping sections spread apart to their limit.

Figure 3 is a section at the line 3—3 of Figure 2.

Figure 4 is a section at the line 3—3 of Figure 2 with the pivoted elongated leaf raised to a vertical position.

Figure 5 is a view similar to Figure 2 showing the elongated pivoted leaves swung to bring the posts in vertical disposition.

Figure 6 is a section at the line 6—6 of Figure 4 with the side cover removed.

Figure 7 is a section at the line 7—7 of Figure 1, with the equalizing mechanism and side covers omitted.

Figure 8 is a view similar to Figure 7 but showing the ends of the sections unlocked in counter-distinction to the construction shown at Figure 7 which shows these sections locked.

Figure 9 is a section at the line 9—9 of Figure 2 with the side covers removed.

Similar numerals of reference denote like parts in the several figures of the drawing.

Figures 10, 11, 12:
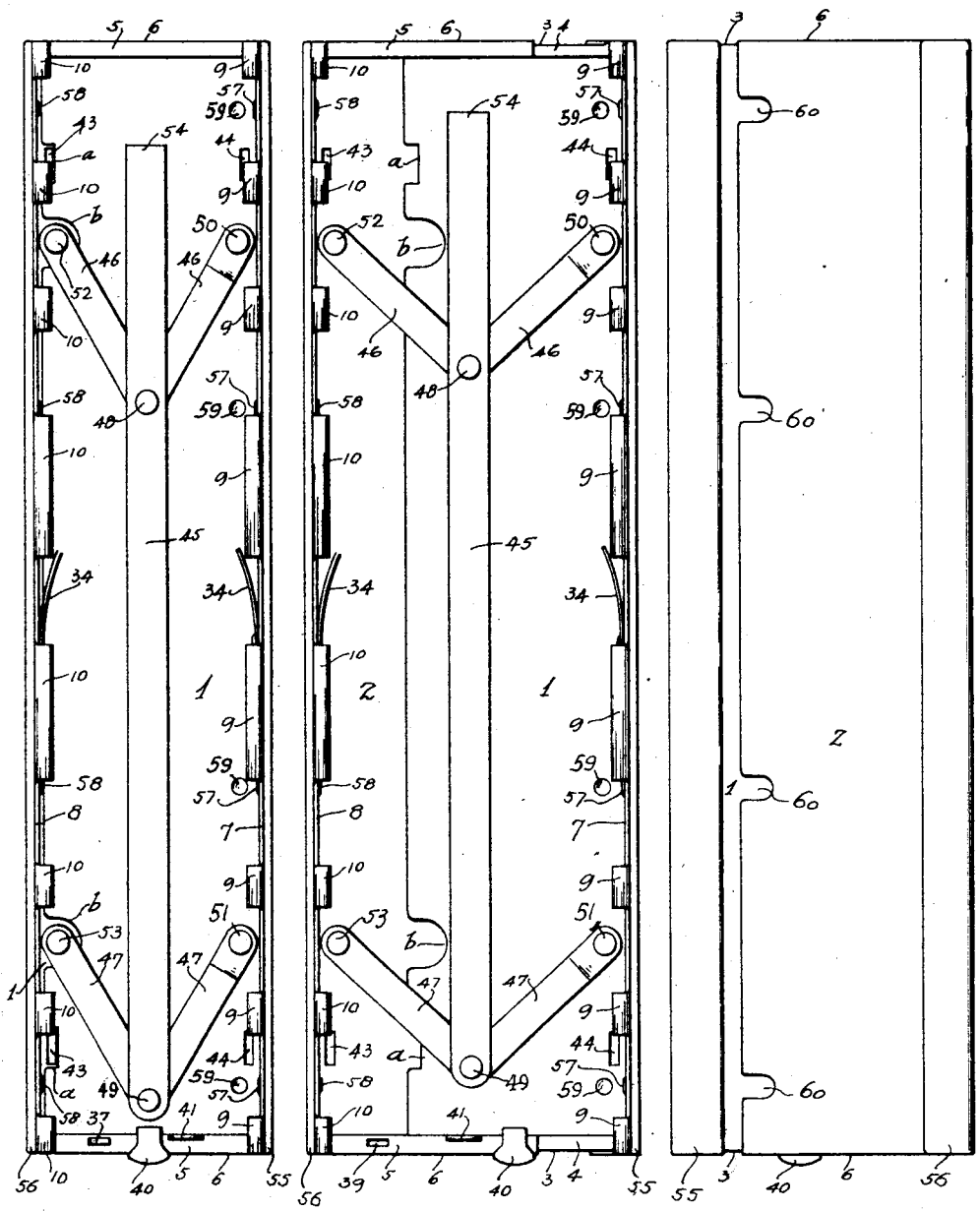
Figure 10 is an inside view of the telescoping sections in closed condition but with the side covers and elongated post carrying leaves removed.
Figure 11 is a view similar to Figure 10 but showing the telescoping sections partly opened, and Figure 12 is a rear view of the book as it appears with the sections partly opened.

1, 2, are telescopically disposed back sections, such as are ordinarily employed in loose leaf ledgers, the section 1 having rectangular ends 3 that terminate in inturned flanges 4 which are disposed in telescoping relation beneath similar inturned flanges 5 at the rectangular ends 6 of the section 2, so that it will be clear that these sections will be held in their telescoping condition and will be free to move inwardly and outwardly with a steady movement.

The sides of these sections are rectangular as shown at 7, 8, and have formed therewith at spaced intervals along their edges hinge eyes 9, 10, and the side covers 11, 12, also have spaced hinge eyes 13, 14, which are alined with the eyes 9, 10, and pintles 15, 16, are passed through these eyes whereby the covers are hinged to the back sections.

17, 18, are elongated leaves having hinge eyes 19, 20, formed at their inner edges, through which eyes the pintles 15, 16, pass, whereby these leaves are pivoted around these pintles independent of the covers.

These leaves extend substantially throughout the length of the sections and have secured to their faces straight posts 21, 22, and when these leaves are swung downwardly in normal position, these posts extend toward each other in parallelism and in staggered relation as shown at Figure 1.

The pivoted elongated leaves 17, 18, are identical in construction and operation, and a description of one of them will be all that is necessary, and, referring particularly to Figures 3, 4, and 5, 23 is an elongated strip that is secured to the inner face of the leaf 17 by means of headed studs 24 that extend from the leaf through elongated slots 25 that are formed in the strip, these studs and slots permitting the strip to have free lengthwise movements.

Pivoted near the extremity of the leaf 17 are bell-crank shaped latches 26 that normally project freely at 27 through a flange 27a of the leaf 17 owing to the action of coil springs 28 connected at their extremities to the leaf 17 and the lower part of each latch.

Each of the latches has a beveled nose 29 and one adjacent extremity of the strip 23 is beveled or otherwise suitably shaped as shown at 30 and is in normal contact with this nose so that it will be clear that when the strip is moved toward the latch it will act on the nose 29 to withdraw the latch.

To the other end of the strip 23 is secured a thumb piece 31 which has a beveled or otherwise suitably shaped terminal 32 that normally contacts the beveled nose 29 of the adjacent latch 26, so that it will be clear that when this thumb piece is moved inwardly both latches will be simultaneously withdrawn.

33 is a coil spring whose extremities are secured respectively to the strip 23 and the leaf 17, the function of this spring being to return the strip to normal position on the release of the thumb piece.

34 is a leaf spring which is secured to the inner face of the side 8, and is therefore intermediate said side and the leaf 17, when the latter is locked down in normal position, and this spring constantly exerts an outward pressure against said leaf, so that when the latter is unlocked by pushing the thumb piece 31 inwardly to withdraw the latches as heretofore described, this spring will throw the leaf outwardly, and prevent accidental locking when the thumb piece is released.

The means for locking the sections together in closed condition is the same as that shown and described in my pending application, No. 222,457, filed September 28, 1927, and a mere brief description of this means will be given in order to further a complete understanding of the present invention.

Referring particularly to Figures 1, 2, 5, 7, 8, 9, 10, and 11, 35 is a lock lever pivoted at 36 to the inside face of one of the ends and having its free end formed into a beveled nose 37, and 38 is a spring whose ends are connected to said face and to the lower free end of said lever, said spring functioning to force said nose within a slot 39 in the opposed flange 5 when the telescoping sections are closed, whereby said sections may be locked as shown at Figures 1 and 7. This lever has formed therewith and upwardly extending therefrom a thumb piece 40 which normally overhangs the flange 5 of the outer telescoping section 2, and when it is desired to unlock the sections this thumb piece is depressed as shown at Figure 8, thus forcing the lever 35 below a certain plane or center whereupon the spring 38 will act to throw the lever downwardly and thus unlock the sections which latter can then be distended to their limit or to any other degree as shown at Figures 2, 5, 9, and 11. On the outer face of the flange 5 at its free extremity, is a curved bumper 41 and as the sections are forced apart the thumb piece 40 will strike this bumper and will be raised, as shown at Figure 9, and this will cause the nose 37 to be forced by the spring 38 upwardly through a cut-away 42 in the flange 4 against the bottom of the flange 5, as shown particularly at Figure 9, so that when the sections are closed the nose will be positioned to engage within the slot 39 to lock the sections.

This locking of the sections is very serviceable when the binder contains so many loose leaves that they will resist the final closing movement, and if no locking mechanism was provided the reaction of the mass of leaves would force the sections apart to a certain degree, and as it is quite desirable to hold the mass of leaves tightly some locking means of this sort is preferably employed.

When the sections are unlocked they may be spread apart, and by pushing the thumb pieces 31 inwardly the leaves 17, 18, may be unlocked, so that these leaves may be swung upwardly, carrying on their posts any desired number of loose leaves, and the latter may be readily removed and replaced, or additional loose leaves may be placed over selected posts. In fact, with these leaves 17, 18, swung upwardly, the binder is then available for any of the functions common to commercial use.

When the leaves 17, 18, are swung downwardly to their normal position, the projections 27 of latches 26 will be forced upwardly by contact with the bottoms of the sections and will thereafter engage within and through the slots 43, 44, in these sections.

In order to further steady the movements of the strip 23, a headed stud $c$ extends from said strip through an elongated slot $d$ in the leaf 17.

In loose leaf binders of this description it is quite advantageous to provide some means whereby the telescoping sections will not bind, either in opening or closing when they are grasped at either end or not at the central portion, and many constructions have been devised for this purpose, but in all of them it has been necessary to perform some manual operation in order that the mechanism can function, but in the present improvement a mechanism for equalizing the strains on the telescoping sections is so connected with the latter that the operation of this mechanism automatically follows either the opening or closing of the sections, and furthermore this equalizing mechanism includes a floating bar that functions to prevent undue spreading of the sections. This equalizing mechanism will now be described.

45 is a floating bar which extends lengthwise of the sections near the bottom thereof to which are pivoted at spaced intervals pairs of toggle levers 46 and 47, the levers of each pair having their outer extremities pivoted respectively to the sections 1, 2.

The spaced pivotal connections of these two pairs of levers with the floating bar are denoted respectively by the numerals 48 and 49. 50, 51, denote the pivotal points of the levers 46 and 47, with the section 1, and 52, 53, designate the pivotal points of the levers 46, 47, with the section 2.

When the sections are in closed condition the parts of this equalizing mechanism will appear as is shown at Figures 1 and 10, with the levers 46 and 47 disposed at a comparatively sharp angle to the floating bar 45, and when the sections are open to their limit the parts of this equalizing mechanism will appear as shown at Figure 2 with the levers 46 and 47 opened out.

The extremity of the floating bar 45 is extended to a predetermined limit beyond the pivotal point 48, and when the sections are opened the floating bar will travel lengthwise toward one end of the book, and at the limit of expansion of these sections this extension which has been denoted by the numeral 54 will abut the end wall of one of the sections, in the present instance the end wall 3 of the section 1, and thus function to prevent undue expansion of the sections.

It is immaterial where the sections are grasped in opening or closing them since the floating bar will move lengthwise and thus equalize the strains upon the sections, and it will be observed that a mere opening or closing of the sections will effect the automatic operation of this equalizing mechanism, and it will be further noted that there is no connection whatever between this mechanism and any part of the book except at the ends of the toggle levers where the latter are pivoted to the respective sections. The edge of the inner section 1 is cut away as shown at $a$ and at $b$ to accommodate the latches 26, and the pivots 52, 53, when the sections are closed.

Books of this description, especially when they contain a mass of loose leaves, are quite heavy, and, unless carefully manipulated, will scratch or mar a desk or table, owing to the contact against the latter of the metal backs of the sections, particularly when the books are placed on a desk or table and the sections opened or closed.

This invention contemplates provisions as against this disadvantage, and to that end strips 55, 56, of non-metallic material, preferably vulcanized fiber, are secured to the sides of the sections by means of headed bolts 57, 58, passed through these strips and the sides of the sections and riveted thereto, as shown at Figures 7, 8, and 9, these strips overlapping the bottoms of the sections, the overlapping portion of the strip 55 being spaced from the bottom of the section 1 a distance sufficient to admit the edge of the section 2, when the sections are closed, and from the bottom of the section 1 depend studs 59 at spaced locations which contact the overlapping portion of the strip 55 so as to reenforce this overlapping portion, and the edge of the section 2 is cut away as shown at 60, so that these cut away portions will admit these studs during the final closing of the sections, as shown at Figures 7, 8, 9, and 12.

As a matter of fact, there are preferably four of these bolts that are passed through each of the strips 55, 56, and riveted to the sides of the sections 1, 2, and these bolts are at spaced locations, and since they are all precisely alike, the illustrations and descriptions with respect to one of them are deemed to be sufficient, and there are also four properly spaced studs 59 that are all precisely alike and that are all in contact with the overlapping portion of the strip 55, and therefore the illustrations and descriptions with respect to one of these studs are likewise deemed to be sufficient.

The fiber strips 55, 56, may be of any suitable color, and the heads of the bolts 57, 58, are countersunk within the strips and are colored accordingly, and the book with these corner strips not only is equipped for the protection of a desk or table but the book itself is of high class appearance.

What is claimed is:—

1. A loose leaf book comprising telescoping back sections, elongated leaves and side covers pivoted to the sides of said sections, straight posts secured to said leaves, means for automatically locking said leaves to said sections with the posts in parallelism with each other and with the bottoms of said sections, and manually operated means for unlocking said leaves whereby the latter may be swung upwardly.

2. A construction as in claim 1, with the addition that spring means is used to throw the leaves outwardly after they have been unlocked, whereby accidental locking may not occur.

3. A construction as in claim 1 further distinguished in that spring latches are pivoted to the inner faces of the leaves, and manually operated resilient elongated strips are slidably secured to said faces, which strips carry means for engaging said latches to withdraw them from said sections.

4. A loose leaf book comprising telescoping outer and inner sections, and non-metallic strips secured to the sides of said sections and overlapping the bottoms thereof, one of said strips being spaced from the inner section a distance sufficient to admit the edge of the outer section when closed.

5. A loose leaf book comprising inner and outer telescoping sections, strips of non-metallic material secured to the sides of said sections and overlapping the bottoms thereof, one of said strips being spaced from the bottom of the inner section a distance sufficient to admit the edge of the outer section at its final closing, and spaced reenforcing members depending from the bottom of the inner section and contacting said material, the edge of the outer section being cut away opposite said members and adapted to enclose the latter when the sections are fully closed.

In testimony whereof I affix my signature hereto.

JOHN SCHADE.